United States Patent [19]

Takenaka

[11] Patent Number: 4,610,538
[45] Date of Patent: Sep. 9, 1986

[54] COLOR COMPENSATION METHOD IN PHOTOGRAPHIC PRINTER

[75] Inventor: Yuji Takenaka, Kaisei, Japan

[73] Assignee: Fuji Photo Film Co., Ltd., Kanagawa, Japan

[21] Appl. No.: 724,634

[22] Filed: Apr. 16, 1985

[30] Foreign Application Priority Data

May 1, 1984 [JP] Japan ................................. 59-88061
Dec. 19, 1984 [JP] Japan ................................ 59-268107

[51] Int. Cl.⁴ ..................................................... G03B 27/72
[52] U.S. Cl. ......................................... 355/69; 355/77
[58] Field of Search .................. 355/32, 35, 77, 69, 355/38; 350/315, 316

[56] References Cited

U.S. PATENT DOCUMENTS 3,184,307  5/1965  Letzer ................................. 350/315
3,702,732  11/1972  Sliwkowski ...................... 355/69 X
3,984,185  10/1976  Vinatzer ........................... 355/77 X
4,050,807  9/1977  Barbieri .............................. 355/77 X Primary Examiner—L. T. Hix
Assistant Examiner—Della Rutledge
Attorney, Agent, or Firm—Wenderoth, Lind & Ponack

[57] ABSTRACT

It is necessary to optimally control exposure conditions in printers and development conditions for negative films and photographic paper in order to achieve color printing of high quality. According to the method of this invention, as the luminance voltage of a light source and color compensation filters for respective colors are controlled automatically and the voltage to be applied to the light source can be minimized to avoid a waste of light. Even if there is insufficient light at the light source due to the deterioration of the light source or the fluctuations in a power source voltage, this method enables one increase the amount of light by increasing the voltage to be applied to the light source.

14 Claims, 9 Drawing Figures

COLOR COMPENSATION METHOD IN PHOTOGRAPHIC PRINTER

BACKGROUND OF THE INVENTION

This invention relates to a color compensation method to obtain optimal conditions for exposure in photographic printers and, more particularly, in color printers, to a color compensation method for adjusting the amount of light which often fluctuates due to differences in the type of color negative films, individual printers and/or picture frames.

In order to print color photographs of high quality, it is necessary to optimally control conditions for development of negative films, conditions for exposure by printers and conditions for development on photographic paper. The amount of light from a light source of a color printer is automatically adjusted by means of cyan (C), magenta (M) and yellow (Y) filters in a color compensation filter type device in the following procedure. The amounts of light for three primary colors obtained when no color compensation filter is inserted in an optical path are measured by photosensors such as photodiodes. The measured values are represented by the letters RI, GI and BI and the target values for R (Red), G (Green) and B (Blue) are represented by the letters Ri, Gi and Bi as shown in FIG. 1. For instance, in the color red R, the target value is attained by decreasing the amount of light by (RI-Ri) with a C-filter. The amounts of light for green G and blue B are also adjusted by inserting an M-filter and a Y-filter to respectively decrease the amounts of light by (GI-Gi) and (BI-Bi) in a manner similar to the above.

Colors are controlled in amounts needed to achieve desired values. If it is assumed that, as shown in FIG. 1, the difference (RI-Ri) between the desired amount of red light and the amount of light actually received from a light source is smaller than the differences (GI-Gi) and (BI-Bi) of green and blue light, the amount of light A=RI-Ri is attenuated for all colors or, in other words, wasted. If the amount of light from the light source is initially set at a low value in order to avoid this waste, such an operation may cause the light amount to be insufficient when the lamps deteriorate or when the power source voltage fluctuates.

SUMMARY OF THE INVENTION

An object of this invention is to provide a color compensation method for adjusting the amount of light from the light source in a color printer by automatically controlling the luminance voltage of the light source in relation to each color compensation filter so as to minimize the luminance voltage of the light source to prolong the life thereof as well as to automatically increase the luminance voltage if the amount of light is not enough.

Another object of this invention is to provide a method for effectively adjusting the amount of light from the light source in a color printer, which controls the conditions for exposure with color compensation filters if the conditions fluctuate according to the differences in the types of color negative films and in the types of color printers, and which controls the conditions for exposure in respective individual frames of a film.

According to this invention in one aspect thereof, for achieving objects described above, there is provided a color compensation method for color printers of the type wherein use is made of CMY-color compensation filters arranged in a light path of a light source for photographic printing, which is characterized in that a color compensation filter of the CMY-color compensation filters having the smallest amount of light requiring compensation is positioned at a predetermined position with respect said light path, the amount of light from the light source is adjusted to a target value set for the positioned filter, and the other two color compensation filters are inserted within said light path for color compensation at said target value.

According to this invention in another aspect thereof, there is provided a color compensation method for color printers of the type wherein use is made of CMY-color compensation filters arranged in a light path of a light source for photographic printing, which is characterized in that the exposure conditions are adjusted for the difference caused by the different types of color negative films by positioning a color compensation filter of the CMY-color compensation filters having the smallest compensation volume at a predetermined position with respect to the light path, adjusting the amount of light from the light source to the target volume for the positioned filter, and placing the other two color compensation filters in said light path; the exposure conditions are adjusted for the difference in respective individual frames of a film by using cut filters.

The nature, principle and utility of the invention will become more apparent from the following detailed description when read in conjunction with the accompanying drawings.

DESCRIPTION OF THE PREFERRED EMBODIMENTS

Figure 2:
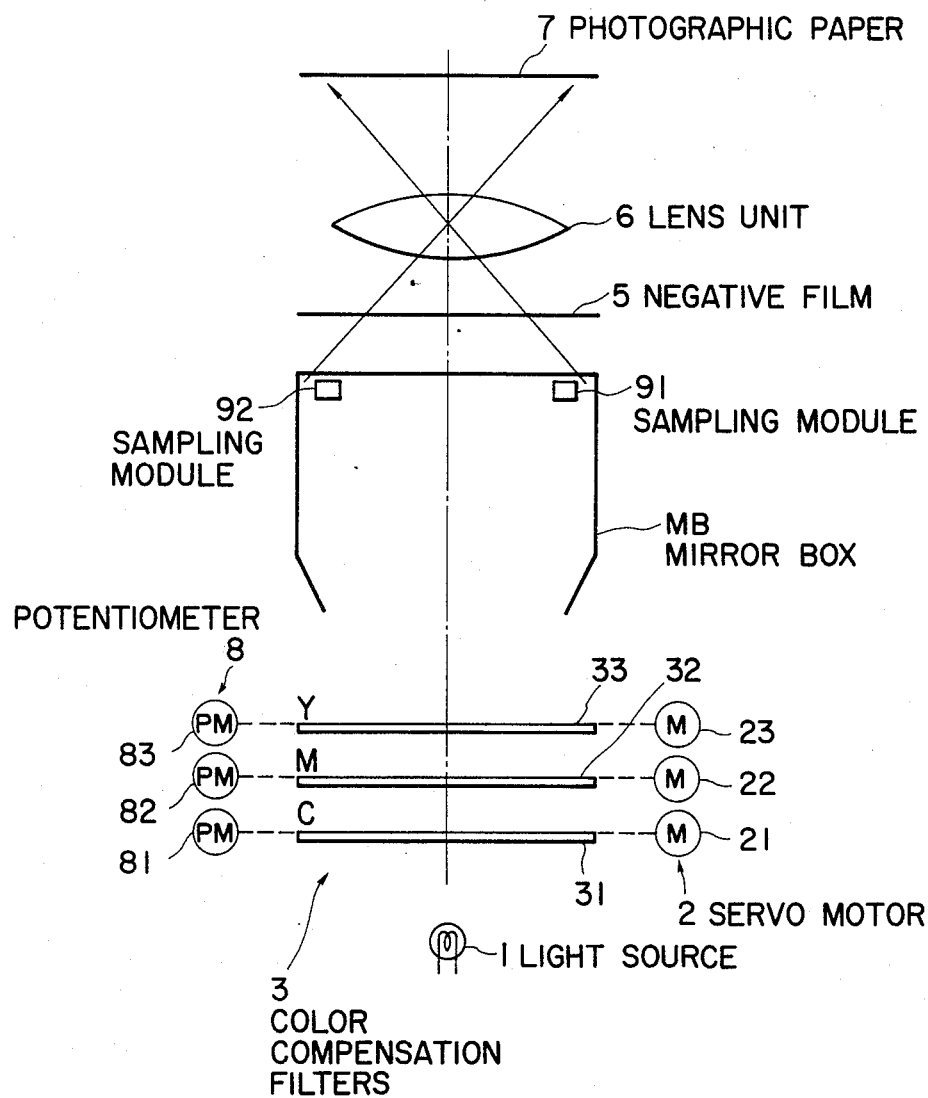
FIG. 2 is a schematic structural view of an embodiment of a photographic printer to which this invention is applied.

FIG. 2 shows an embodiment of the photographic printer according to this invention wherein a negative film 5 is illuminated by the light from the light source 1 via color compensation filters 3 of CYM (31 through 33) and a mirror box MB. The light transmitted through the negative film 5 is projected on a photographic paper (color paper) 7 via a lens unit 6. Modules 91 and 92 for sampling light amount provided on the upper side of the mirror box MB are composed of optical sensors such as photodiodes for detecting the amount of light in the three primary colors of RGB. The detection signals IR, IG and IB from the sampling modules 91 and 92 indicate the current amounts of respective lights.

Figure 3:
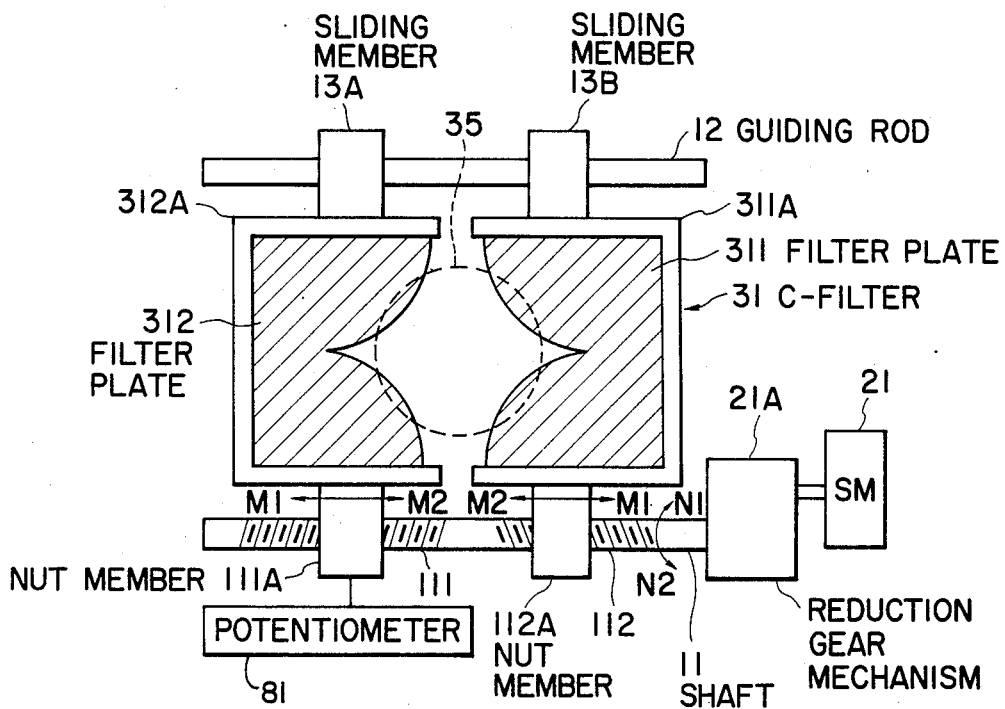
FIG. 3 is a structural view used to show an embodiment of a color compensation filter.

The color compensation filters 3 have a structure shown in FIG. 3. Since the CMY-filters 31 through 33 have an identical structure, the description herein will be provided only for the C-filter 31 for the sake of brevity. The C-filter 31 comprises a pair of filter plates 311 and 312, each plate comprising a combination of two quadrant members. The filter plates 311 and 312 are fixed with nut members 111A and 112A provided on sides of frames 311A and 312A in a manner to allow the opening/closing thereof in the directions M1 and M2, respectively. The nut members 111A and 112A are screwed on a shaft 11 having screws 111 and 112 which are threaded with pitches of opposing directions. If the shaft 11 is turned in the direction N1, the nut members 111A and 112A are respectively turned in the direction M1 while if the shaft 11 is turned in the direction N2, they are respectively turned in the direction M2. On the other sides of the frames 311A and 312A are provided sliding members 13A and 13B to slide on a guiding rod 12 provided in parallel thereto. The shaft 11 is driven by a servo motor 21 via a reduction gear mechanism 21A. The nut member 111A is provided with a potentiometer 81 to detect the degree of opening of the C-filter 31. A light path 35 is formed between and at the center of the filter plates 311 and 312. The size of the light path 35 is adjusted by moving the nut members 111A and 112A in the directions M1 and M2 by turning the shaft 11. The filters 32 and 33 may be operated in the similar manner; each filter is driven by a servo motor 22 or 23 and the opening may be detected by a potentiometer 82 or 83.

Figure 4:
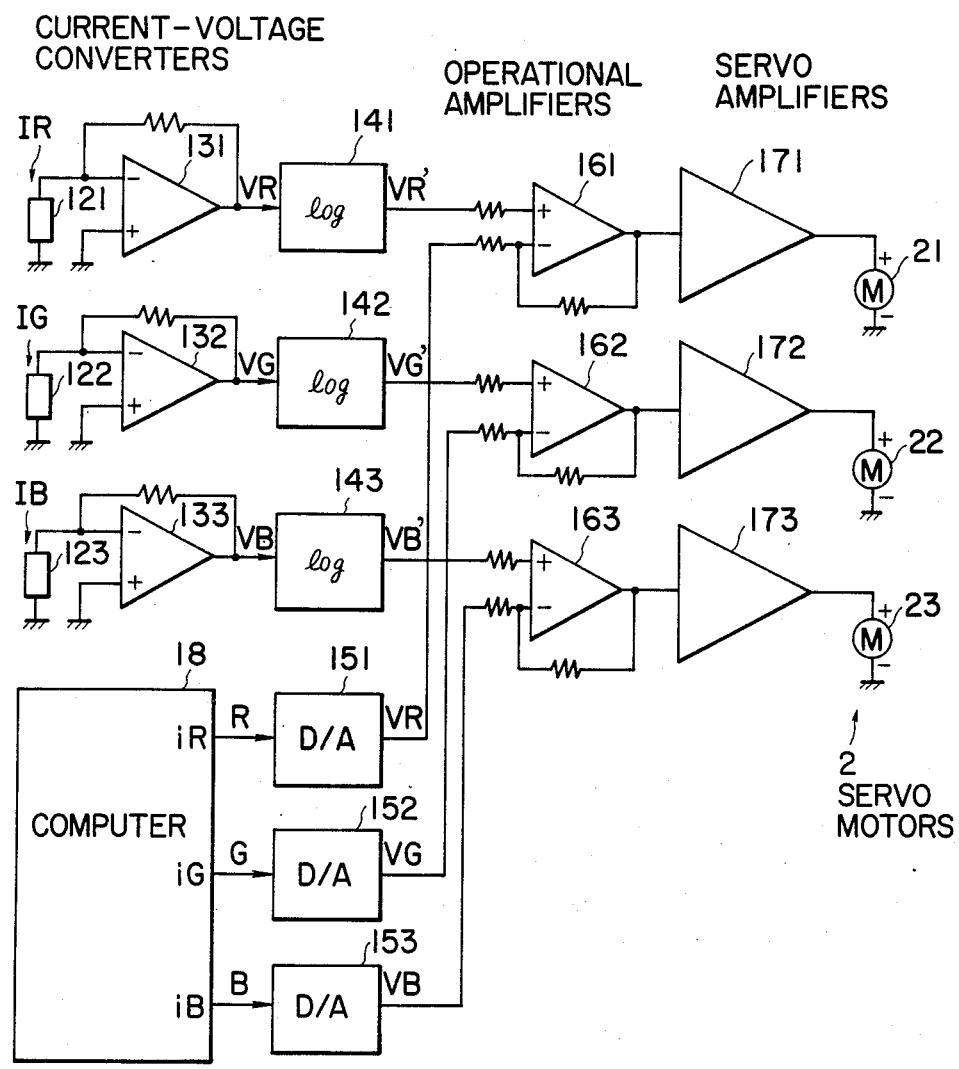
FIGS. 4 and 5 are circuit diagrams to show an embodiment of a circuit which realizes the color compensation according to this invention method which color compensation filters and light source voltage.
Figure 5:
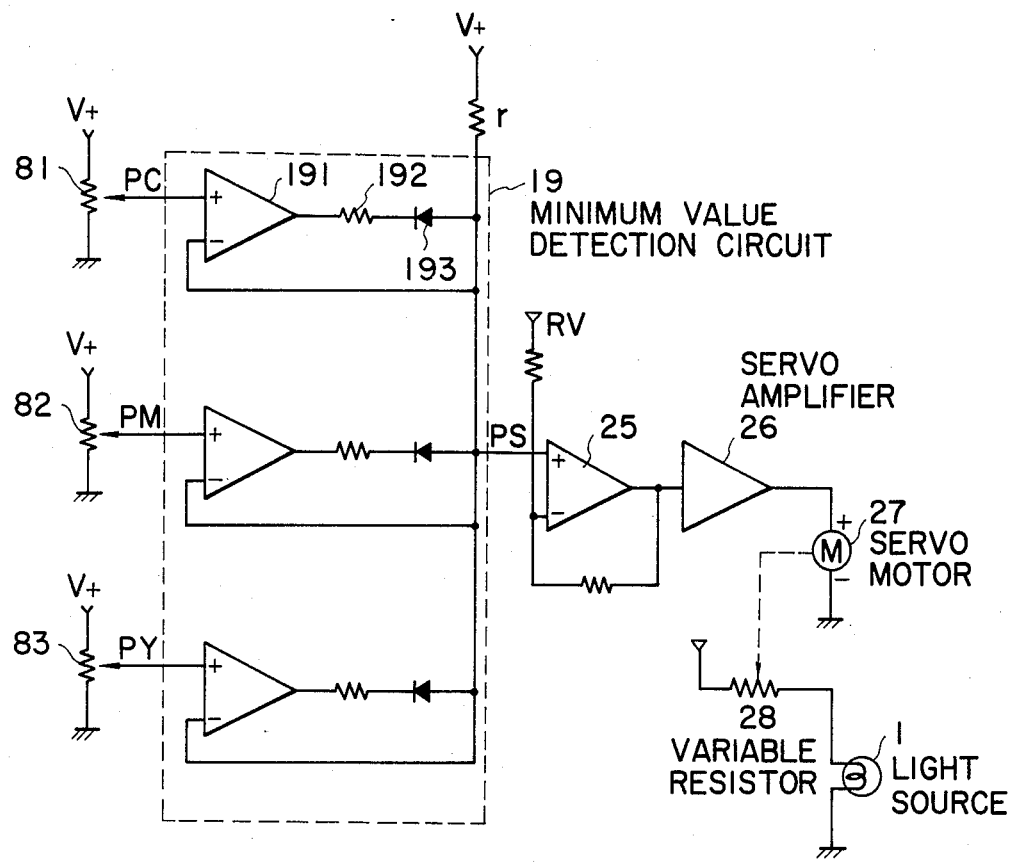

FIGS. 4 and 5 show the control circuits of this invention. The detection signals IR, IG and IB obtained from the sampling modules 91 and 92 in the mirror box MB are respectively converted into voltages VR, VG and VB by current-voltage converters 131 through 133 and are then converted into density signals VR', VG' and VB' by logarithmic converters 141 through 143. A computer 18 for controlling a printer outputs the target values iR, iG and iB of three colors in the form of digital signals R, G and B which are converted to the voltages VR, VG and VB which correspond to the target values obtained by D/A converters 151 through 153. Operational amplifiers 161 through 163 respectively calculate the difference between the voltages vR, vG and vB and the voltages VR', VG' and VB' indicating the densities outputted from the logarithmic converters 141 through 143 for the three primary colors and the differences are inputted into servo amplifiers 171 through 173 so as to drive servo motors 2 (21 through 23) for adjusting the opening of filters 31 through 33, respectively.

The openings of the filters 31 through 33 can be adjusted by driving servo motors 21 through 23 in the control system shown in FIG. 4 in a manner to make the light amounts of the colors RGB projected on the sampling modules 91 and 92 coincide with the target values R, G and B or, in other words, to make the input deviation of operational amplifiers 161 through 163 zero. The openings of the filters are detected for each color by the potentiometers 81 through 83 as shown in FIG. 5. Among the colors, the filter having the minimum filtering amount with respect to the light path 35 or the filter having the largest opening is detected by a minimum value detection circuit 19. The detection circuit 19 has an identical structure for each color. In the case of the color C, for instance, the detection circuit comprises an operational amplifier 191 which receives the opening signal PC as an input from the potentiometer 81, a resistor 192 and a diode 193 which are serially connected to the output, and the outputs from respective circuits are combined and connected to a power source V+ via a resistor r. The output PS from the minimum value detection circuit 19 is inputted to the operational amplifier 25, and compared with the reference voltage RV which sets the reference position of the color compensation filters 3. The difference in voltages from the operational amplifier 25 is sent to a servo amplifier 26 to drive a servo motor 27 for actuating a variable resistor 28 which controls the luminance of the light source 1. The opening signals PC, PM and PY outputted from the potentiometers 81 through 83 become smaller in accordance with the opening degrees of the color compensation filters 31 through 33, respectively.

Figure 6:
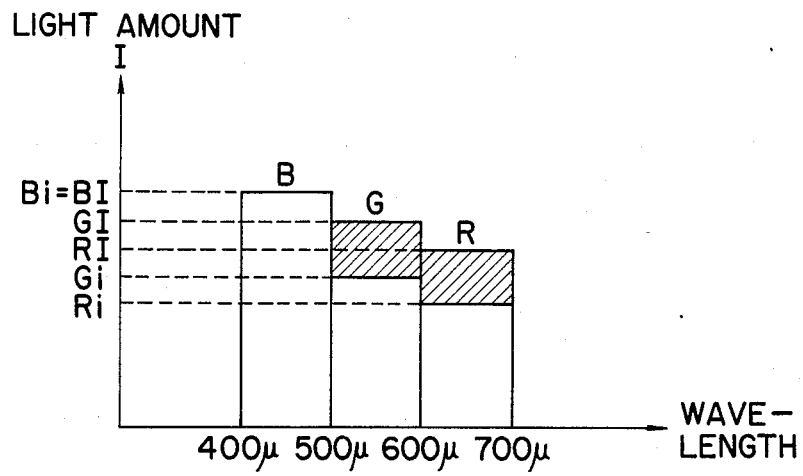
FIG. 6 is an explanatory graph for the color compensation operation according to this invention.

The above explained structure will be operated for controlling the amount of the light from the light source 1 in a manner described below referring to FIGS. 6 and 7.

The computer 18 obtains and outputs the target amounts R, G and B of light for the three colors from the photometric data such as LATD (Large Area Transmittance Density) for the types of films, the characteristics of the particular photo-sensitive material, and/or negative images. The target values R, G and B are respectively converted into the voltage signals VR, VG and VB from their digital form by D/A converters 151 through 153 and are inputted to operational amplifiers 161 through 163. The amounts of light of RGB colors which have been detected by the photosensors 121 through 123 in the sampling modules 91 and 92 are converted into the light amount signals VR', VG' and VB' by the current-voltage converters 131 through 133 and the logarithmic converters 141 through 143. The deviations from the target amounts VR, VG and VB are calculated by the operational amplifiers 161 through 163, respectively. The deviations from the operational amplifiers 161 through 163 are respectively inputted into the servo amplifiers 171 through 173 to drive servo motors 21 through 23 in accordance with the particular deviation until such time that the deviation becomes equal to zero. When the servo motors 21 through 23 are driven, the shaft 11 is rotated via the reduction gear mechanism 21A as shown in FIG. 3 and the nut members 111 and 112 are moved in the direction M1 or M2, thereby controlling the openings of the filters 31 through 33.

Figure 1:
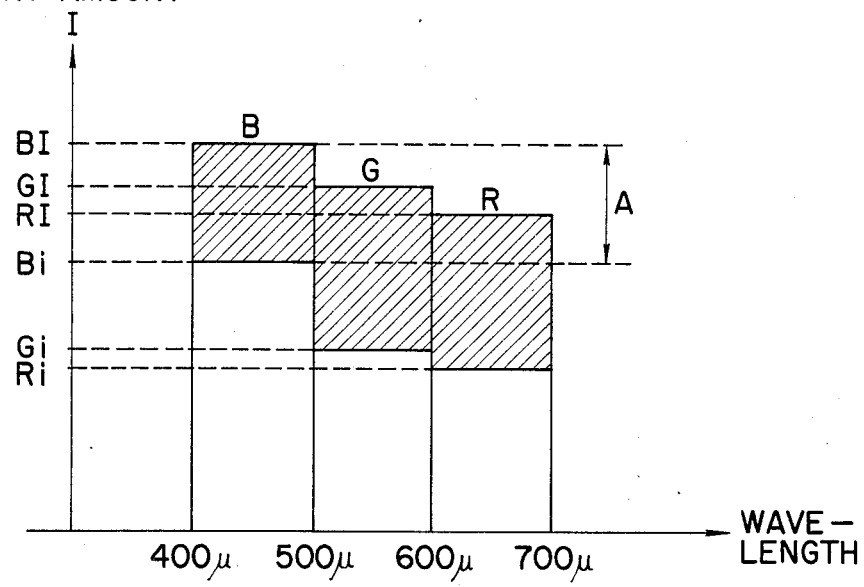
FIG. 1 is a graph to explain the principles of the color compensation method by CMY filters.

Simultaneously with the above operation of setting the openings of the filters 31 through 33 at the target values R, G and B, the potentiometers 81 through 83 output the voltage signals PC, PM and PY indicating the openings of the filters 31 through 33, respectively. The minimum of the signals PC, PM and PY is outputted from the minimum value detection circuit 19 as a minimum value signal PS. The minimum value signal PS is compared with the reference voltage RV and the openings of the filters 3 are controlled in accordance with the result of the above comparison, for instance, so as to come to contact with the outer periphery of the light path 35. Accordingly, if the minimum value signal PS is smaller than the reference voltage RV, a negative voltage is outputted, while if the signal PS is larger than the reference voltage RV, the minimum voltage signal PS is outputted so as to place the filter among the filters 3 which has the smallest opening at a predetermined position in the direction of the light path 35, for instance, the position just contacting the light path 35. The amount of the light from the light source 1 can be effectively utilized by setting the reference voltage RV in a manner to make the openings of the filters 3 coincide with the size of the light path 35. For example, as shown in FIG. 1, if the filtering amount is larger than the set value, the minimum value signal PS becomes larger than the reference voltage RV. As a positive voltage is inputted to the servo amplifier 26, the variable resistor 28 of the color compensation circuit is reduced to decrease the voltage to be applied to the light source 1 and hence, the amount of the light. As shown in FIG. 6, by the operations described above, the filter having the largest opening (B) is not moved but the amount of light from the light source 1 is reduced while the other two filters (G and R) are moved to compensate for their respective colors. In other words, one of the filters 3 is always placed outside the light path 35 to gain the target light volume.

Although one of the color compensation filters 3 is placed outside the light path 35 in the above description, it is not necessarily placed outside.

Another embodiment of this invention will now be described referring to FIG. 7.

Figure 8:
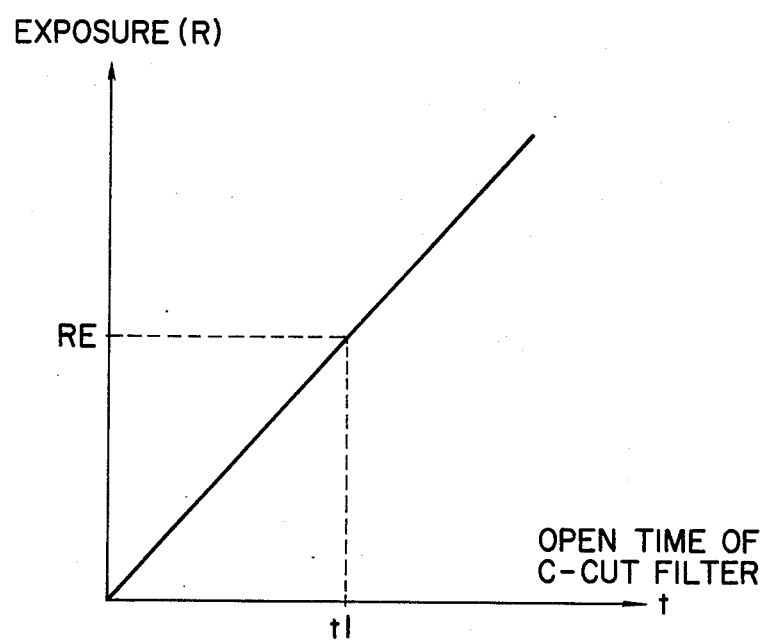
FIG. 8 is a view used to explain the principle of the color compensation with cut filters according to this invention.

The photographic printer according to this invention is provided with above described color compensation filters 3 and cut filters 4 (41, 42 and 43). A negative film 5 is adapted to be illuminated by the light from a light source 1 via color compensation filters 3 of CMY and cut filters 4 of CMY. The light transmitted through the negative film 5 is projected on a photographic paper 7 via a lens unit 6 and a black shutter 40. The negative film 5 is reeled on reels 51 and 52, and moved to be positioned at an arbitrary location on a frame printing section by revolving the reels 51 and 52. The sampling modules 91 and 92 detect the amounts of lights of three colors RGB to output detection signals IR, IG and IB. The operation and structure of color compensation filters 3 have already been described. Since the cut filters 4 have an identical structure for the C-cut filter 41, the M-cut filter 42 and the Y-cut filter 43, a description will be provided only for the C-cut filter 41 for the sake of brevity. The C-cut filter 41 is closed when a solenoid 44 provided on a driving shaft is not driven so as to allow only the light of G (green) and B (blue) to be transmitted and to cut the light of R (red). FIG. 8 shows the effect of the C-cut filter 41 to obtain the exposure proportional to the time t during which the C-cut filter 41 is open. For instance, if the optimal exposure of red (R) is assumed to be RE, the duration of the time t, when the C-cut filter 41 is opened, may be set at time t1. The CMY-cut filters 4 (41 through 43) may be driven by any of the cut filter control circuits generally used for the purpose. The circuits shown in FIGS. 4 and 5 are used.

Figure 7:
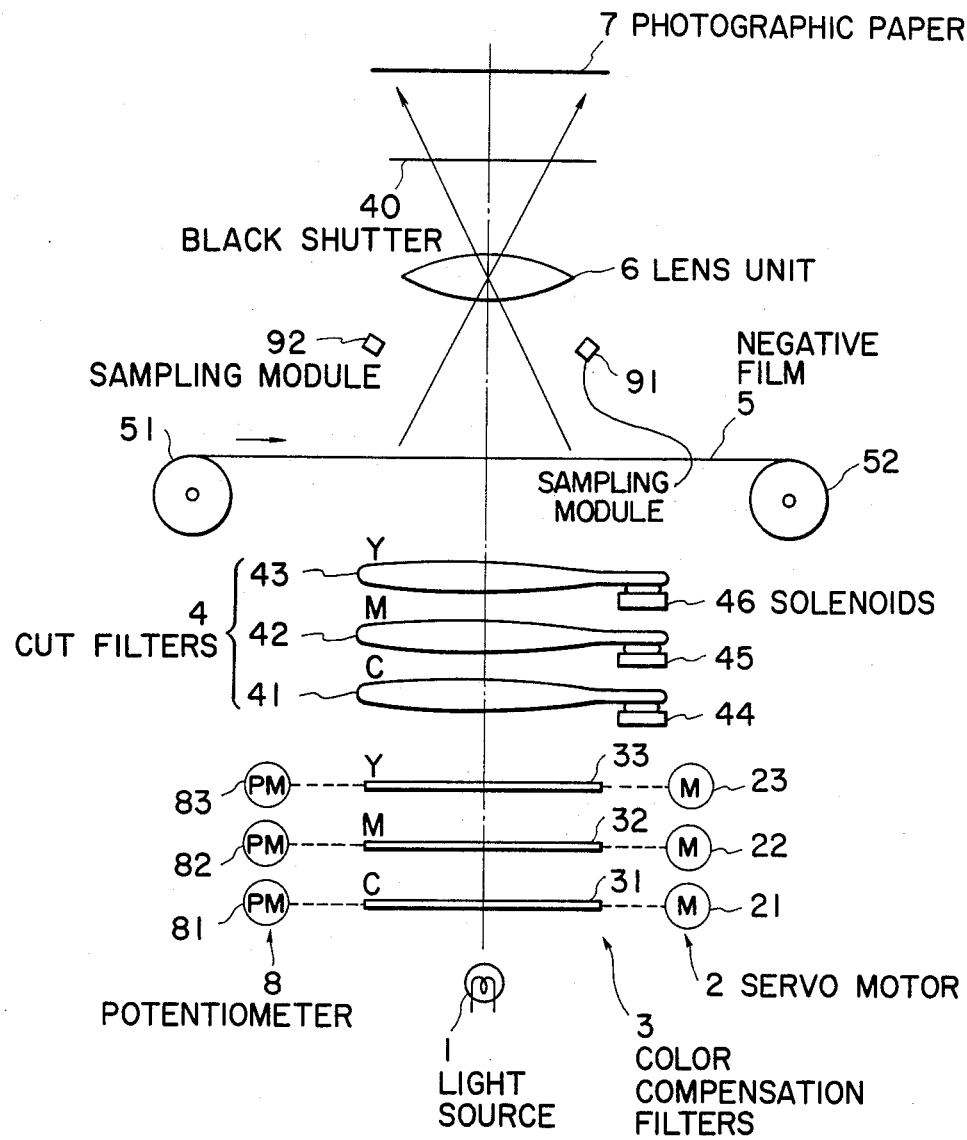
FIG. 7 is a schematic structural view used to show another embodiment of the photographic printer to which this invention is applied.

Referring now to FIG. 7, the color printer is color compensated as follows. The color is compensated by separate procedures for the differences caused by the types of negative films and/or the printers and for the differences caused by the exposure conditions of each frame.

First of all, in order to compensate for the differences by the film and/or printer types, the CMY color compensation filters 3 (31 through 33) and the light source voltage of the light source 1 are controlled in the following steps.

An operator mounts as a color negative film 5 a reference negative film which is prepared exclusively for the type of negative film which is going to be used in the printer, and sets the computer 18 at the adjustment mode with the reference negative film. In this mode, the computer 18 obtains and outputs the target amounts of lights of RGB from the photometric data of LATD in the form of digital signals R, G and B, which are respectively converted into the voltage signals VR, VG and VB by A/D converters 151 through 153 before being inputted in operational amplifiers 161 through 163. The light which has been transmitted through the reference negative film is detected by photosensors 121 through 123 in the sampling modules 91 and 92. The thus detected amounts IR, IG and IB of the three colors RGB are converted into the light amount signals VR', VG' and VB' by the current-voltage converters 131 through 133 and the logarithmic converters 141 through 143, and the deviations from the target values VR, VG and VB are obtained by the operational amplifiers 161 through 163. The deviations from the operational amplifiers 161 through 163 are respectively inputted to the servo amplifiers 171 through 173 to drive the servo motors 21 through 23 in accordance with the deviation until such time that the deviation becomes zero. When the servo motors 21 through 23 are driven, the openings of the filters 31 through 33 will be adjusted in the above described steps.

Simultaneously with the operation of adjusting the openings of the filters 31 through 33 to the target values R, G and B, the minimum voltage signal out of the voltage signals PC, PM and PY from the potentiometers 81 through 83 is outputted from the minimum value detection circuit 19 as a minimum value signal PS. The minimum value signal PS is compared with the reference voltage RV and the openings of the color compensation filters 3 are controlled in accordance with the difference. When the minimum value signal PS is smaller than the reference voltage RV, a negative voltage is outputted, while when the minimum value signal PS is larger than the reference voltage RV a positive voltage is outputted so as to thereby place one of the filters 3 having a minimum opening at a predetermined location outside the light path 35 or, in other words, at a position either contacting the light path 35 or slightly in the light path. The amount of the light from the light source 1 can be used most effectively by setting the reference voltage RV so as to make the openings of the color compensation filters 3 coincide with the size of the light path 35. For instance, as shown in FIG. 3, when the amount of light which is filtered by one of filters 3 and enters into the light path 35 is larger than the preset value, the minimum value signal PS becomes larger than the preset value RV, and a positive voltage is inputted to the servo amplifier 26 to decrease the output value of the variable resistor 28 of the color compensation circuit, thereby decreasing the voltage to be applied to the light source 1 and hence, the amount of light. By the above operation, the filter having the largest opening is reduced in the amount of light from the light source 1 without being moved while the other two filters are moved for color compensation. In short, instead of decreasing the amount of the light from the light source 1, one of the filters 3 is always placed at a predetermined position outside the light path 35 in order to gain the target value.

Conversely, if the target value is not obtained even if the color compensation filters 3 are placed at the predetermined positions as above described, the minimum value PS becomes smaller than the reference voltage RV and negative voltage is inputted to the servo amplifier 26 to open the variable resistor 28, thereby increasing the voltage to be applied to the light source 1 and hence, the light amount. The target value of the light amount can be obtained by increasing the amount of light from the light source 1 but without changing the filter having the largest opening while by moving other two filters. One of the color compensation filters 3 is not necessarily placed at a predetermined position outside the light path 35, but may be positioned partly in the light path.

With reference to the reference negative film, the amount of the light from the light source 1 is adjusted by the color compensation filters 3. Simultaneously with the above operation, the voltage to be applied to the light source 1 is adusted to an amount required for color compensation by the filters 3.

After the color is compensated by means of a reference film, the positions of the color compensation filters 3 and the voltage applied to the light source 1 are fixed by setting the computer 18 at the adjustment mode for each frame. Then the operator may take out the reference negative film and place a negative film in the printer as a negative film 5 for carrying out printing for each frame. The operation of printing respective frames of the negative film 5 will be described below.

The reels 51 and 52 are rotated first so that a frame which is going to be printed comes to a printing position and an unexposed photographic paper 7 is mounted at a predetermined position. When the above preparation is completed, the procedure proceeds to an exposure operation. A black shutter 40 is opened and solenoids 44 through 46 are driven to open all the cut filters 4 (41 through 43) of CMY. In the exposing operation thus started, the exposure for each of RGB has already been detected in LATD by sampling modules 91 and 92 to determine the optimal exposure for each color according to a predetermined calculation formula. A solenoid 44 which drives the C-cut filter 41, a solenoid 45 which drives the M-cut filter 42 and a solenoid 46 which drives the Y-cut filter are actuated for the duration of time set for the exposure. The photographic paper 7 is exposed at an optimal value for each color, and then the black shutter 40 is closed to complete print of one frame. As the positions of the color compensation filters 3 and the value of voltage applied to the light source 1 are fixed, the exposure time for each frame is controlled only by the duration of time when the cut filters 4 of CMY open.

Figure 9:
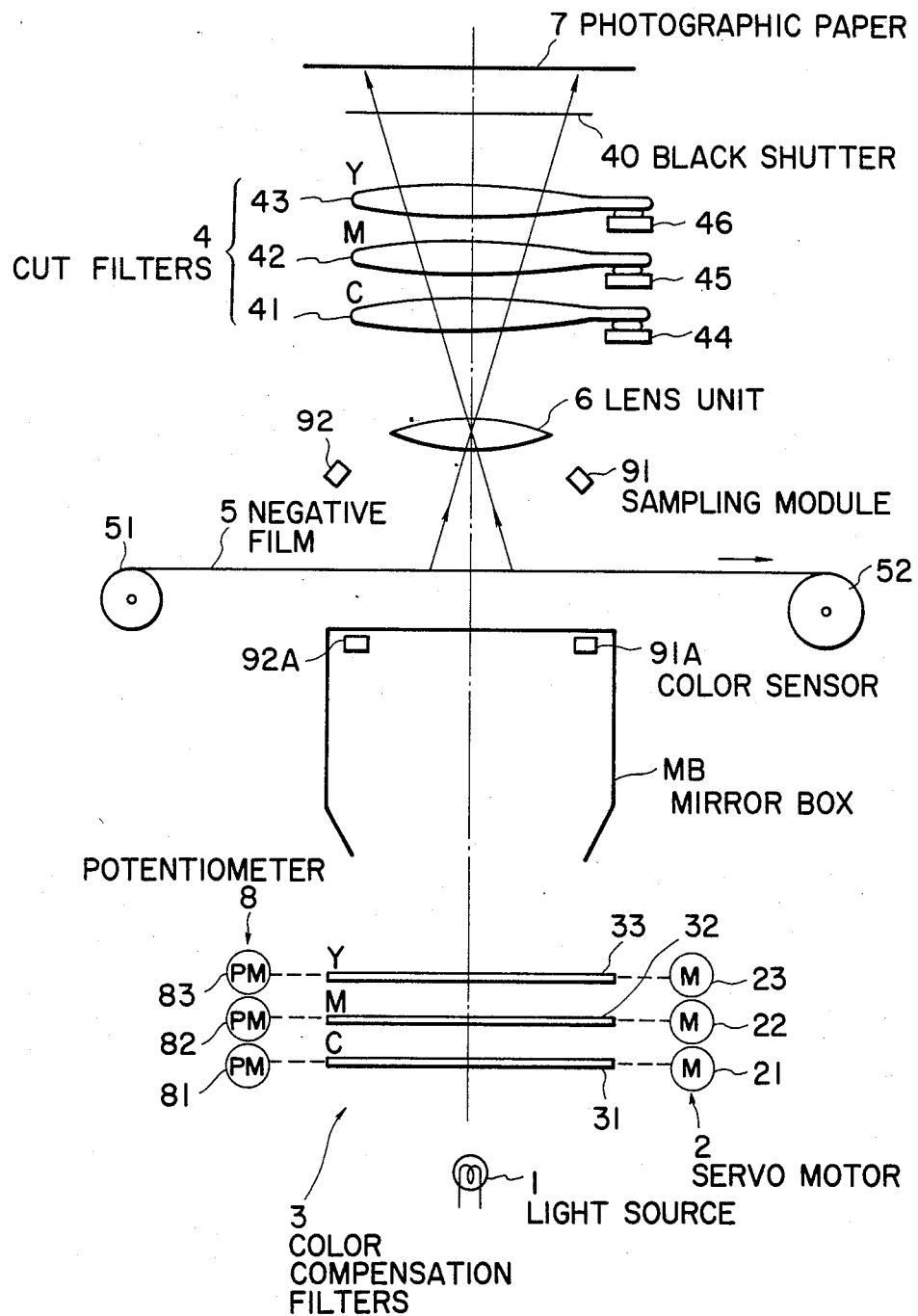
FIG. 9 is a schematic structural view used to show still another embodiment of the photographic printer to which this invention is applied.

Although a reference negative film is used to adjust the color compensation filters 3 in the above described embodiment, the system may be structured not to use such a reference negative film as shown in FIG. 9. The CMY-cut filters 4 (41 through 43) are provided between the lens unit 6 and the black shutter 40, a mirror box MB is arranged between the color compensation filters 3 and the negative film 5, and color sensors 91A and 92A are housed in the mirror box MB for photometry of optical system. By this arrangement, the color sensors 91A and 92A are adapted to measure the color balance of the light source 1 and the color compensation filters 3 to thereby conduct the color compensation according to the above mentioned method. The sampling modules 91 and 92 measure LATD for each frame and the cut filters 4 are controlled according to the result of this measurement for printing. Although the sensors have to be provided for two systems in this embodiment, the present embodiment is advantageous as it need not use a reference negative film.

This invention is most conveniently applied to photographic printers, but may be applied to other devices or systems which control the amount of light by attenuating the light amount by filters or the like. For instance, this invention may be applied to the light source in a device where a pick-up element is used to replace the photographic paper in FIG. 2 to take out picture images of the negative film 5 in the form of a television signal.

As described hereinabove, this invention enables one to minimize the voltage which is to be applied to the light source to thereby avoid consumption of a large amount of light as well as to prolong the life of the light source. This invention also enables to one increase the amount of light simply by increasing voltage applied to the light source even if the light source does not have sufficient light due to deterioration or fluctuation of its power source voltage. This invention achieves rapid and effective printing since it need not drive color compensation filters for each frame of a negative film.

It should be understood that many modifications and adaptations of the invention will become apparent to those skilled in the art and it is intended to encompass such obvious modifications and changes in the scope of the claims appended hereto.

What is claimed is:

1. A color compensation method for color printers using CMY-color compensation filters arranged in a light path of a light source for photographic printing, comprising: positioning a color compensation filter which is selected from said CMY-color compensation filters and has the smallest compensation value at a predetermined position with respect to said light path, and adjusting the amount of light from the light source to a target value set for the positioned filter, and inserting the other two color compensation filters within said light path for color compensation at said target value.

2. A method as claimed in claim 1, wherein said predetermined position is a position contacting or just outside of said light path.

3. A method as claimed in claim 1, wherein said predetermined position is a position slightly within said light path.

4. A method as claimed in claim 1, wherein the color compensation filter, is selected from said CMY-color compensation filters and having the largest opening, is used to attenuate the light from said light source without being moved.

5. A method as claimed in claim 1, wherein if the target amount of light is not obtained even if one of said CMY-color compensation filters is placed outside of said light path, then the amount of light from the light source is increased.

6. A color compensation method for color printers using CMY-color compensation filters arranged in a light path of a light source for photographic printing comprising: adjusting the exposure conditions for differences caused by the different types of color negative films by positioning a color compensation filter which is selected from said CMY-color compensation filters and has the smallest compensation value at a predetermined position with respect to the light path, and adjusting the amount of light from the light source to a target value for the positioned filter, and placing the other two color compensation filters within said light path, and adjusting the exposure conditions for the difference in respective individual frames of a film by using cut filters.

7. A method as claimed in claim 6, wherein said predetermined position is a position contacting or just outside of said light path.

8. A method as claimed in claim 6, wherein said predetermined position is a position slightly within said light path.

9. A method as claimed in claim 6, wherein the amount of light passing through said color compensation filters is adjusted by photographically measuring a reference negative film.

10. A method as claimed in claim 6, wherein the amount of light passing through said color compensation filters are adjusted by measuring the light source and the light which has been transmitted through said color compensation filters.

11. A method as claimed in claim 9, wherein said reference negative film is taken out of the measurement section after photometry, a negative film which is to be printed is mounted, and a frame of said negative film is measured for controlling said cut filters.

12. A method as claimed in claim 11, wherein said measurement is conducted between said negative film and a photographic paper.

13. A method as claimed in claim 10, wherein a frame of the negative film which is to be printed is measured photographically after said measurement for controlling of said cut filters.

14. A method as claimed in claim 13, wherein the measurement for said color compensation filters is conducted between said light source and the negative film and the measurement for said cut filters is conducted between said negative film and a photographic paper.

* * * * *